(12) United States Patent
Reimann et al.

(10) Patent No.: US 6,584,389 B1
(45) Date of Patent: Jun. 24, 2003

(54) INFORMATION SPECIFIC ACTUATABLE CONTROL SYSTEM

(75) Inventors: Martin Reimann, Hamm (DE); Josef Schriek, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/659,576

(22) Filed: Sep. 11, 2000

(30) Foreign Application Priority Data

Sep. 10, 1999 (DE) .......................................... 199 43 484

(51) Int. Cl.⁷ .............................. B60R 1/06; B60R 16/02
(52) U.S. Cl. ........................... 701/49; 701/36; 180/287; 180/268; 340/426; 340/438; 340/539; 340/902; 340/988; 307/10; 307/10.2
(58) Field of Search .............................. 701/49, 53, 36, 701/211; 180/287, 289, 268, 167; 340/825.31, 996, 426, 438, 539, 902, 988, 10.2; 307/10, 10.2; 359/843

(56) References Cited

U.S. PATENT DOCUMENTS

| | | | | |
|---|---|---|---|---|
| 4,477,874 A | * | 10/1984 | Ikuta et al. ............ | 340/825.31 |
| 4,997,053 A | * | 3/1991 | Drori et al. ................ | 180/287 |

FOREIGN PATENT DOCUMENTS

| | | | |
|---|---|---|---|
| DE | 3817495 A | * | 11/1989 |
| DE | 3817495 C2 | | 6/1992 |
| DE | 4238301 A1 | | 5/1994 |
| DE | 4238301 A | * | 5/1994 |
| DE | 19650048 | | 6/1998 |
| DE | 19728226 | | 1/1999 |
| DE | 29720720 U1 | | 5/1999 |
| DE | 19753086 | | 6/1999 |
| EP | 770524 A | * | 10/1996 |
| JP | 6321028 | | 11/1994 |

* cited by examiner

*Primary Examiner*—Thomas G. Black
*Assistant Examiner*—Tuan C To
(74) *Attorney, Agent, or Firm*—Birch, Stewart, Kolasch & Birch, LLP

(57) ABSTRACT

A control unit for user-specific adjustment of device settings in a motor vehicle on the basis of user data according to a specific key, where the control unit recognizes the users in the seat positions in a motor vehicle on the basis of identification means assigned to each user. The control system is characterized by a great variability and convenience. Instead of allowing only driver-specific settings, the control system according to the present invention allows a person-specific selection of seat positions, climate control or multimedia entertainment. This is made possible by means of a seat-specific identification.

20 Claims, 1 Drawing Sheet

INFORMATION SPECIFIC ACTUATABLE CONTROL SYSTEM

BACKGROUND OF THE INVENTION

This application claims a priority based on German application serial number 199 43 484.0, filed Sep. 10, 1999, and the contents of that application are incorporated herein by reference.

1. Field of the Invention

This invention relates to a control unit for user-specific adjustment of devices in a motor vehicle on the basis of user data stored for a specific key.

2. Related Art

Such a control unit is known from German Patent No. 38 17 495 C2. However, this known control unit takes into account only the ergonomic conditions in the driver's seat, but not the needs of any passengers.

SUMMARY OF THE INVENTION

Therefore, the object of the present invention to provide a control system that takes into account the needs of one or more passengers. In addition, it should be as easy and convenient as possible to operate. Preferably, it should fulfill its function automatically.

This object and other objects of the present invention are achieved by providing a control unit, which recognizes users in seat positions in a vehicle on the basis of identification means assigned to the users.

Although this should not restrict the scope in any way, the identification means are referred to in the following discussion in general as identification cards, as they represent an advantageous embodiment. However, the physical embodiment of an identification means is of course not limited to the card form.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
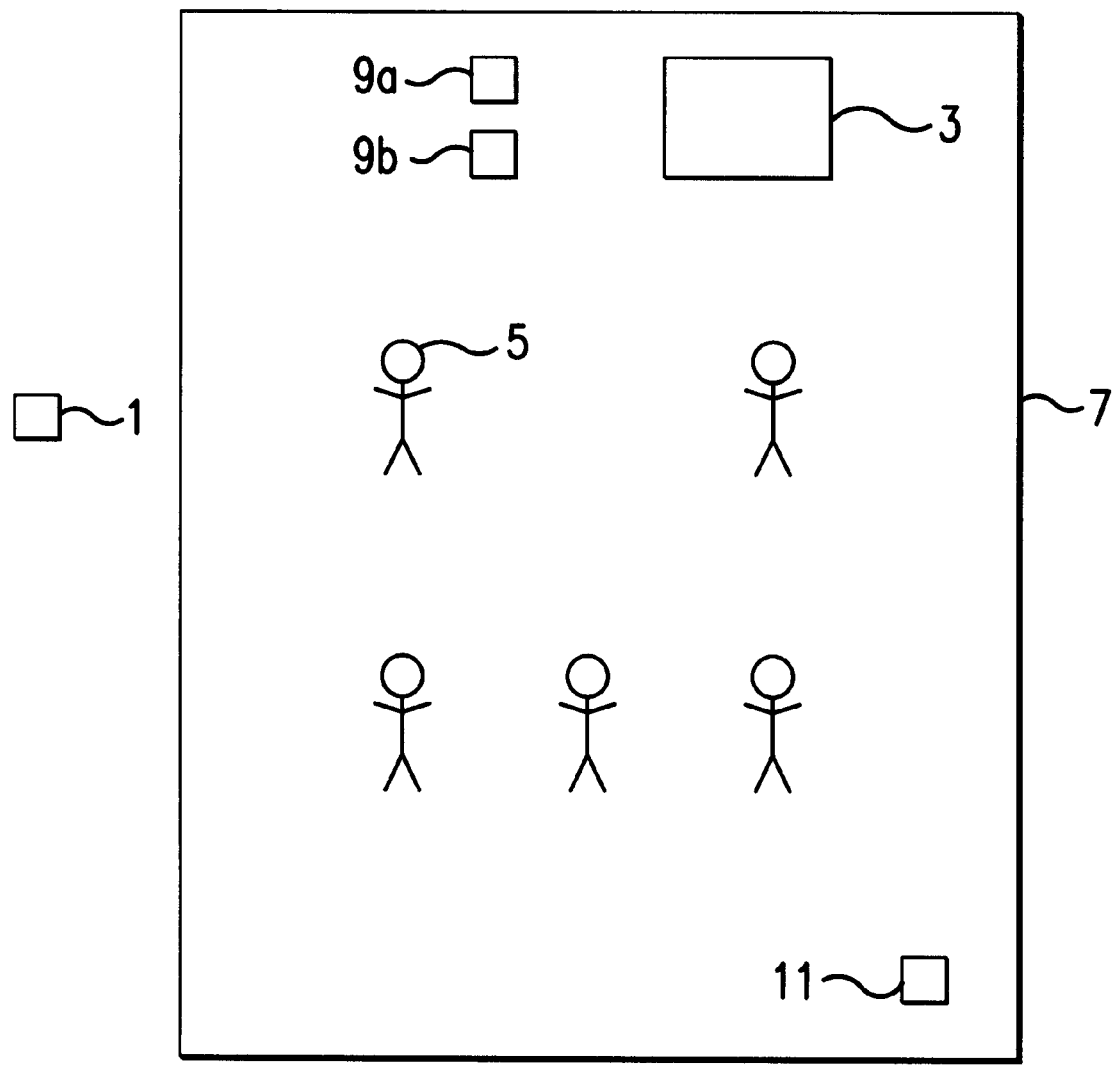
FIG. 1 is a block diagram of the present invention.

On the basis of the identifiers on identification cards 1, the control system 3 according to the present invention can determine the seating position of each person 5 in the interior of a vehicle 7 by using this identification card 1.

Card-specific information for different functions such as the settings for the seat adjustment, the air conditioning system or radio is stored in the control system 3 itself. This information is transmitted to the corresponding control devices 9a, 9b after definite allocation of people (identification cards) and seats. To do so, only the identifiers of the identification cards 1 are stored in the control system 3. The individual data is stored in the respective control devices 9a, 9b. After the allocation, the control system 3 transmits the identifier of the identification card to the proper control devices 9a, 9b. The control devices in turn adjust their actuators according to the personal data. The transmission medium may be a direct hard-wired data line, or in a networked vehicle, it may be the existing bus system. Wireless transmission media may also be used.

The advantage of the present invention is that the storage and analysis functions are based on each seat position respectively. This results in increased convenience not only for the driver, but also for all passengers in possession of a valid identification card. A specific reason this system is so easy to operate is because it does not require significant user interaction.

With a free choice of seats in the motor vehicle 7, the control system 3 recognizes by way of antennas 11 where the users 5 have seated themselves in the vehicle on the basis of the identification cards 1 assigned to and carried by each user (the function of these identification cards 1 may also be implemented in the form of a key). At the respective positions chosen by each of the users, the control system 3 implements the settings previously stored on the identification cards and thus specific for each user.

Examples of various user settings which may be adjusted via the use of the identification cards 1 are as follows: seat position settings for all seat positions, mirror settings, temperature settings (right, left, front, rear, optionally average values), automatic locking of the door assigned to the driver/passenger(s) if necessary (while driving, when the vehicle is stopped, on leaving the vehicle), card-specific transmission settings (sport, economical, etc.) based on the person in the driver's seat; adjustments in pedal characteristics for use with brakes, gas, or the like, use of an identification card integrated into a child seat for deactivation of systems such as airbags, settings of audio and video systems; ultimately all conceivable operable and adjustable systems and servo drives, even those that might be added in the future (either externally or internally) for the driver's seat or the various passenger seats.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control unit for user-specific settings of devices in a motor vehicle, wherein the control unit recognizes driver and passenger in specific seat positions in the motor vehicle on the basis of individual identification means assigned to each driver and passenger.

2. The control unit according to claim 1, wherein the identification means are designed as battery-operated chip cards or as transponder cards.

3. The control unit according to claim 1, wherein the control unit has a device for recognizing driver and passenger at each seat position in the motor vehicle.

4. The control unit according to claim 1, wherein the control unit makes adjustments in the settings of the devices in the motor vehicle on the basis of stored user-specific data assigned to the recognized driver and passenger.

5. The control unit according to claim 4, wherein the user-specific settings include the various seat position settings.

6. The control unit according to claim 4, wherein the user-specific settings include positioning of a vehicle mirror.

7. The control unit according to claim 4, wherein the user-specific settings include temperature settings of an air conditioning system.

8. The control unit according to claim 4, wherein the user-specific settings include settings of audio and video systems.

9. The control unit according to claim 1, wherein communication between the control unit and the individual identification means is accomplished by wireless transmission.

10. A control unit for controlling user-specific settings of a device in a motor vehicle, the control unit recognizing driver and passenger in specific locations in the motor vehicle on the basis of individual identification assigned to the driver and passenger.

11. The control unit according to claim 10, wherein the specific location is a seat of the motor vehicle.

12. The control unit according to claim 11, wherein the seat is a front seat.

13. The control unit according to claim 11, wherein the seat is a rear seat.

14. The control unit according to claim 10, wherein the passenger is a non-driving passenger.

15. The control unit according to claim 10, wherein the control unit recognizes a specific driver in the motor vehicle on the basis of individual identification assigned to the driver.

16. A method for controlling user-specific settings of a device in a motor vehicle, said method comprising the steps of:

recognizing a driver and specific passenger in specific locations in the motor vehicle on the basis of individual identification assigned to the driver and passenger; and controlling said device according to the location recognized and the individual identification.

17. The method according to claim 16, wherein the passenger is a non-driving passenger.

18. The method according to claim 16, wherein the user-specific settings includes various seat position settings, positioning of a vehicle mirror, temperature settings, or settings of audio and video systems.

19. The method according to claim 16, wherein the individual identification are battery-operated chip cards or transponder cards.

20. The method according to claim 16, wherein the control unit adjusts settings of the device in the motor vehicle on the basis of stored user-specific data assigned to the passenger.

\* \* \* \* \*